United States Patent
Enomoto et al.

(10) Patent No.: US 8,182,022 B2
(45) Date of Patent: May 22, 2012

(54) POWER SUPPLY APPARATUS FOR SLIDING DOOR

(75) Inventors: Noritsugu Enomoto, Tokyo (JP); Masatoshi Ushiyama, Tokyo (JP); Yasuhiko Mukai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 919 days.

(21) Appl. No.: 12/042,959

(22) Filed: Mar. 5, 2008

(65) Prior Publication Data
US 2009/0044455 A1  Feb. 19, 2009

Related U.S. Application Data

(63) Continuation of application No. PCT/JP2006/317559, filed on Sep. 5, 2006.

(30) Foreign Application Priority Data

Sep. 5, 2005  (JP) ................................. 2005-256814
Mar. 29, 2006  (JP) ................................. 2006-090567

(51) Int. Cl.
*B60R 16/02* (2006.01)
(52) U.S. Cl. ...................... 296/155; 49/360; 296/191.11
(58) Field of Classification Search .................. 296/155, 296/191, 146.7, 190.11, 223, 146.4; 49/360, 49/358; 174/72 A
See application file for complete search history.

(56) References Cited

U.S. PATENT DOCUMENTS

| 2,896,889 | A | * | 7/1959 | Hershberger et al. | ........... 248/71 |
| 6,108,976 | A | * | 8/2000 | Kato et al. | ....................... 49/360 |
| 6,176,715 | B1 | * | 1/2001 | Buescher | ...................... 439/162 |
| 6,358,073 | B1 | * | 3/2002 | Jhanson et al. | ................ 439/164 |
| 6,809,264 | B2 | * | 10/2004 | Watanabe et al. | ........... 174/72 A |
| 7,075,011 | B1 | * | 7/2006 | Kogure et al. | .............. 174/72 A |
| 7,086,687 | B2 | * | 8/2006 | Aoki et al. | ..................... 296/155 |
| 7,220,129 | B1 | * | 5/2007 | Nishijima et al. | ............... 439/34 |
| 2002/0005014 | A1 | * | 1/2002 | Doshita et al. | ................. 49/360 |
| 2002/0151213 | A1 | | 10/2002 | Aoki et al. | |
| 2004/0084932 | A1 | | 5/2004 | Suzuki et al. | |
| 2004/0108127 | A1 | | 6/2004 | Aoki et al. | |

FOREIGN PATENT DOCUMENTS

DE  198 14 670 A1  10/1998
EP  1 314 613 A2  5/2003
EP  1 314 613 A3  5/2003

(Continued)

OTHER PUBLICATIONS

U.S. Appl. No. 12/203,741, filed Sep. 3, 2008, Ushiyama, et al.
Japanese Office Action mailed Nov. 4, 2011 in Patent Application No. 2007-534431 w/English Translation.

*Primary Examiner* — Glenn Dayoan
*Assistant Examiner* — Pinel Roman
(74) *Attorney, Agent, or Firm* — Oblon, Spivak, McClelland, Maier & Neustadt, L.L.P.

(57) ABSTRACT

A power supply apparatus for sliding door, comprising a body-side fixing unit fixed to a vehicle body, a door-side fixing unit fixed to a sliding door, and a flat cable having a connector on both ends thereof respectively, arranged to run from the vehicle body through the body-side fixing unit and the door-side fixing unit to the sliding door, wherein the flat cable is used in such a manner that a longitudinal direction in a cross sectional area in at least a bent portion of the flat cable is in accordance with a height direction of the vehicle body.

16 Claims, 9 Drawing Sheets

FOREIGN PATENT DOCUMENTS

| | | |
|---|---|---|
| JP | 11-093514 | 4/1999 |
| JP | 2002-079892 | 3/2002 |
| JP | 2004-048849 | 2/2004 |
| JP | 2004-147469 | 5/2004 |
| JP | 2005-170188 | 6/2005 |
| JP | 2005-178700 | 7/2005 |
| JP | 2006021690 A * | 1/2006 |
| WO | WO 00/73095 A1 | 12/2000 |

* cited by examiner

Fig. 8
(a) lock fitting
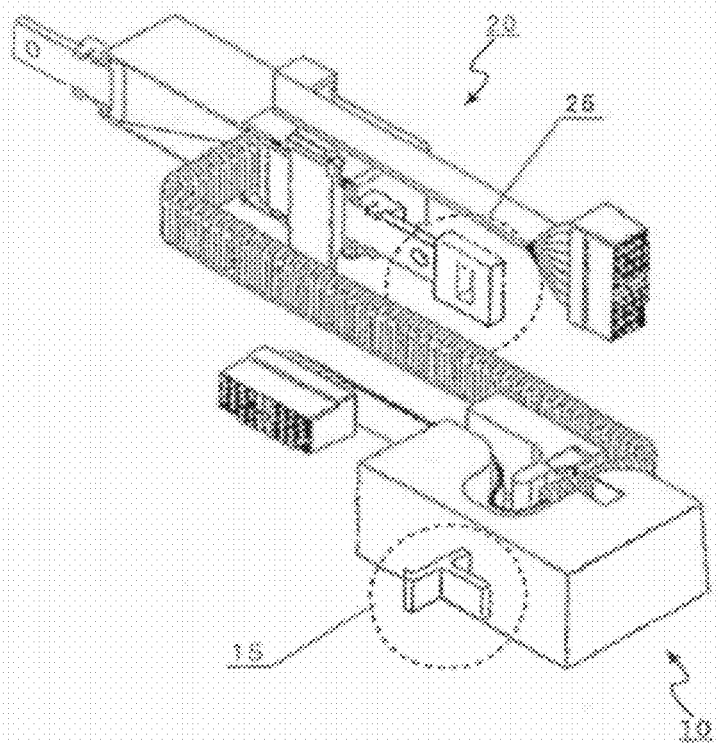
(b) press fitting
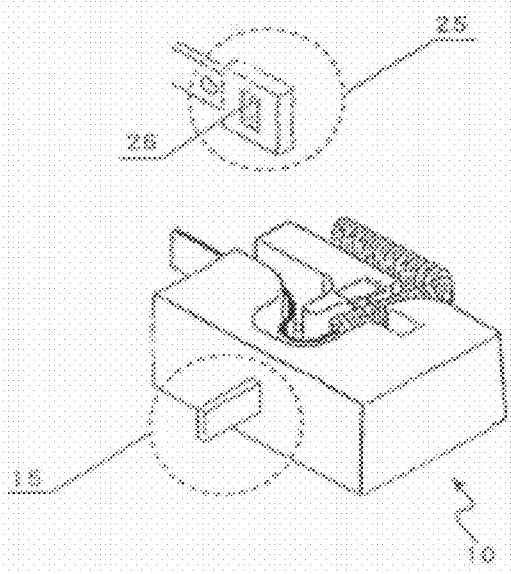

full closing full opening

POWER SUPPLY APPARATUS FOR SLIDING DOOR

TECHNICAL FIELD

The present invention relates to the power supply apparatus for sliding door for supplying power and transmitting the signal from the body side of the automobile to devices within the sliding door all the time.

BACKGROUND ART

Such devices as the power window motors, switches, speakers or the like are incorporated into the sliding door used for a one box car or a wagon car or the like. In order to supply power to the devices from the vehicle body side, it must be designed that electric wire (wire harness) is arranged to run from the vehicle body side to the sliding door side, while the wire harness smoothly follow the opening and closing of the sliding door. A round wire having high flexibility has been conventionally used as the wire harness.

It is known that there is proposed the power supply apparatus for sliding door in which the wire harness winding unit is provided in the vehicle body side, and the surplus length of the wire harness accompanied with the opening and closing of the sliding door is wound so as to be adjusted (refer to Patent document 1).

It is also known that there is proposed the power supply apparatus for sliding door in which the corrugated tube receiving therein the wire harness is arranged to run with extra-length enough for bending between the prescribed position in the vehicle body and the sliding door, where one end of the corrugated tube is fixed to the sliding door, and the vicinity of the other end is supported in laterally movable by the bracket attached to the vehicle body (refer to Patent document 2).

Patent document 1: Japanese Patent Application Publication Hei 11-93514
Patent document 2: Japanese Patent Application Publication

DISCLOSURE OF THE INVENTION

Problem to be Solved by the Invention

However, since the power supply apparatus for sliding door disclosed in the Patent document 1 has the structure in which the wire harness is brought out of the winding unit without covering, the wire harness is contacted with the other member (for example, slide rail or the like) to be damaged. In addition, since the winding unit is necessitated to wind and bring out the same length of the wire harness as the stroke of the opening and closing of the sliding door, the size of the apparatus becomes larger.

Furthermore, since the power supply apparatus for sliding door disclosed in the Patent document 2 have to include the corrugated tube receiving the wire harness long enough for absorbing the stroke of the opening and closing of the sliding door, although the wire harness is received within the corrugated tube, thus preventing the wire harness from being damaged. In particular, since the round wire is used as the wire harness, the corrugated tube can not be sufficiently bent. On the other hand, the wire harness is arranged to run with enabling sufficient bending, a large space is required, in addition to that the corrugated tube becomes loosening to contact with the other member, to generate noise, or to be damaged.

The present invention is made to solve the above described problems, and an object of the invention is to provide the power supply apparatus for sliding door enabling to prevent the wire harness from contacting the vehicle body or the sliding door to be damaged, and enabling to be downsized with fewer components.

Means to Solve the Problem

The first embodiment of the power supply apparatus for sliding door of the invention, comprises:
a body-side fixing unit fixed to a vehicle body;
a door-side fixing unit fixed to a sliding door; and
a flat cable having a connector on both ends thereof respectively, arranged to run from the vehicle body through the body-side fixing unit and the door-side fixing unit to the sliding door;
wherein the flat cable is used in such a manner that a longitudinal direction in a cross sectional area in at least a bent portion of the flat cable is in accordance with a height direction of the vehicle body.

In the second embodiment of the power supply apparatus for sliding door, the longitudinal direction in a cross sectional face in at least the bent portion of the flat cable is perpendicular to a crossing direction defined by a direction perpendicular to both of the vehicle body and the sliding door.

In the third embodiment of the power supply apparatus for sliding door, a conductor enclosed within the flat cable comprises a rectangular conductor.

In the fourth embodiment of the power supply apparatus for sliding door, the apparatus further includes a lock mechanism which couples the body-side fixing unit and the door-side fixing unit to be provisionally fixed each other.

In the fifth embodiment of the power supply apparatus for sliding door, the lock mechanism has a structure in which the body-side fixing unit is provisionally fixed to the door-side fixing unit, even when the door-side fixing unit is fixed to the sliding door.

In the sixth embodiment of the power supply apparatus for sliding door, the flat cable has a prescribed surplus length within the body-side fixing unit and/or the door-side fixing unit.

In the seventh embodiment of the power supply apparatus for sliding door, at least two flat cables are arranged in a bundle, and the respective prescribed surplus lengths of the flat cables are different by prescribed length.

In the eighth embodiment of the power supply apparatus for sliding door, a length of the flat cable is arranged such that a prescribed tensile force is applied on the flat cable when the sliding door is closed.

In the ninth embodiment of the power supply apparatus for sliding door, the body-side fixing unit is fixed to a vicinity of central portion of the vehicle body when the sliding door is closed, while the door-side fixing unit is fixed to a front portion of the sliding door, and the flat cable is substantially perpendicularly fixed to the body-side fixing unit, while the flat cable is obliquely fixed to the door-side fixing unit with a prescribed angle.

In the tenth embodiment of the power supply apparatus for sliding door, the flat cable is fixed to the door-side fixing unit such that the flat cable is bendable within an angle formed by an opening portion at an outlet portion of the door-side fixing unit.

In the eleventh embodiment of the power supply apparatus for sliding door, an electric cable protecting member is further provided in an enveloping manner across an outer surface of the flat cable arranged between the body-side fixing unit and the door-side fixing unit.

In the twelfth embodiment of the power supply apparatus for sliding door, the electric cable protecting member is respectively fixed with prescribed angle in connection with a longitudinal direction thereof to each of the body-side fixing unit and the door-side fixing unit.

In the thirteenth embodiment of the power supply apparatus for sliding door, the electric cable protecting member comprises a corrugated tube with a wave-shaped outer configuration, thus being bendable along a side direction in a cross sectional area thereof.

In the fourteenth embodiment of the power supply apparatus for sliding door, the body-side fixing unit is fixed to a vicinity of central portion of the vehicle body when the sliding door is closed, while the door-side fixing unit is fixed to a front portion of the sliding door, and the electric cable protecting member is substantially perpendicularly fixed to the body-side fixing unit, while the electric cable protecting member is obliquely fixed to the door-side fixing unit with a prescribed angle.

In the fifteenth embodiment of the power supply apparatus for sliding door, the electric cable protecting member is fixed to the door-side fixing unit such that the electric cable protecting member is bendable within an angle formed by an opening portion at an outlet portion of the door-side fixing unit.

In the sixteenth embodiment of the power supply apparatus for sliding door, a length of the electric cable protecting member is arranged such that a prescribed tensile force is applied on the electric cable protecting member when the sliding door is closed.

In the seventeenth embodiment of the power supply apparatus for sliding door, the electric cable protecting member has a cut portion across the lower portion thereof.

Effect of the Invention

As described above, according to one of the embodiments of the present invention, since the flat cable is used for the wire harness to supply power to the sliding door, and the flat cable is arranged to run in such manner that the longitudinal direction in the cross sectional area is in accordance with a height direction of the vehicle body the between the body-side fixing unit and the door-side fixing unit, it is possible to prevent the flat cable from being sagged, and also to provide a power supply apparatus for sliding door with small number of components which enable to be downsized. Since the flat cable is arranged to run in such manner that the cross sectional face in the bent portion of the flat cable is perpendicular to the crossing direction between the vehicle body and the sliding door, it is possible that the flat cable is further prevented from being sagged. Furthermore, since the body-side fixing unit is connected to the door-side fixing unit by the corrugated tube which has the rectangular cross sectional area with vertically long axis, and the flat cable is contained within the corrugated tube, the flat cable can be protected, the stability thereof can be improved.

One of the embodiment of the power supply apparatus for sliding door of the invention includes the lock mechanism to provisionally fix the body-side fixing unit to the door-side fixing unit, and it is designed that a prescribed bent pattern is given to the flat cable or the corrugated tube during the time until the body-side fixing unit is actually fixed to the vehicle body. With the bent pattern, it is designed that the traces of the flat cable or the corrugated tube in the bending movement becomes substantially constant. As a result, it is possible that the flat cable or the corrugated tube can be prevented from contacting with the vehicle body or the sliding door to be damaged or to generate noise.

Furthermore, since the flat cable has a surplus length within the body-side fixing unit or/and the door-side fixing unit, it is possible to design such that an excessive tension is not impressed on the flat cable, even if the manufacture tolerance, the assembly tolerance and the installation tolerance are provided with the power supply apparatus for sliding door of the invention, thus enabling to prevent the flat cable from breaking and to provide a highly reliable power supply apparatus for sliding door of the invention.

BRIEF DESCRIPTION OF THE DRAWINGS

FIG. 8 is a plan view showing an example of the shipment configuration of other embodiment of the power supply apparatus for sliding door of the invention;

FIG. 9(a) is a side view of the corrugated tube 40, FIG. 9(b) is a cross sectional view of the corrugated tube 40, FIG. 9(c) is a perspective view of the corrugated tube with the rib 56, and Fig. (d) is a cross sectional view thereof;

Figure 1:
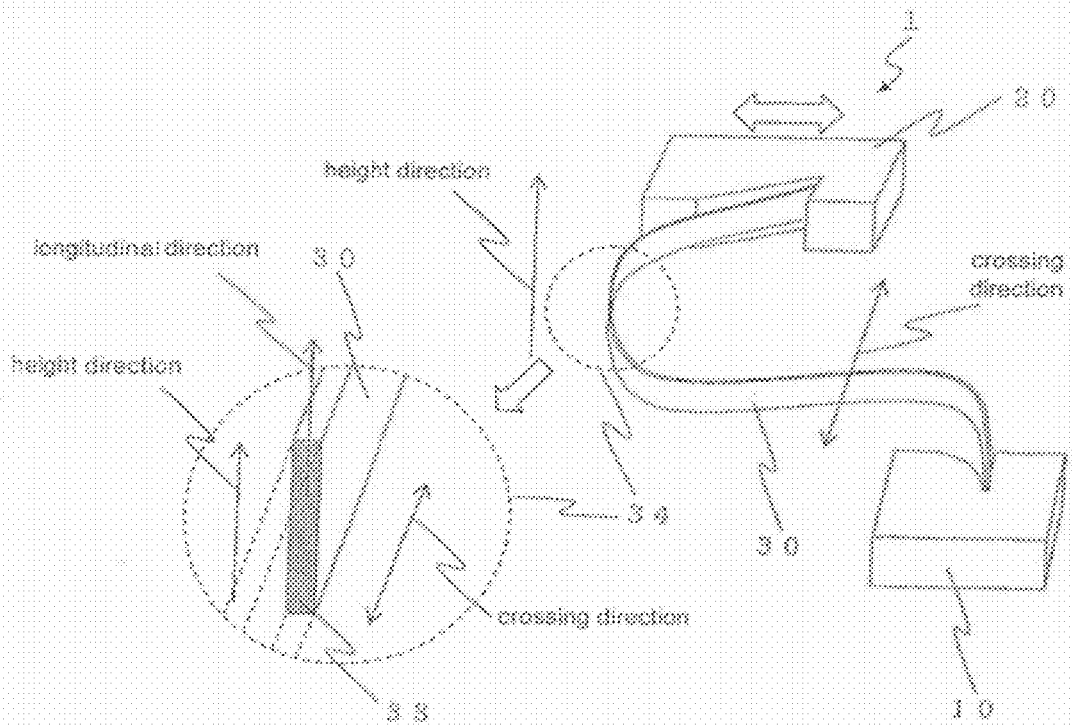
FIG. 1 is a perspective view of one of the embodiments of the power supply apparatus for sliding door of the invention.

EXPLANATION OF REFERENCE NUMERALS 1, 2 . . . power supply apparatus for sliding door
10 . . . body-side fixing unit
11 . . . inlet
12, 26 . . . cable band
13 . . . surplus length receiving portion
14 . . . outlet
15 . . . lock insertion portion
20 . . . door-side fixing unit
21 . . . cable extracting portion
22 . . . door holder
23 . . . holder cover
24 . . . water proof seal
25 . . . lock receiving portion
30 . . . flat cable
31, 32 . . . connector
33 . . . cross sectional area
34 . . . bent portion
40 . . . corrugated tube 51 . . . vertical length
52 . . . lateral length
53,54 . . . portion to be fixed
55 . . . cut portion
56 . . . rib
61,63 . . . outlet portion
62 . . . curved portion
64 . . . angle

BEST MODE FOR IMPLEMENTING THE
INVENTION

Preferable embodiments of the power supply apparatus for sliding door of the invention is described in detail with reference to the drawings. For simplicity of the description, each component having the same function uses the same reference numerals.

FIG. 1 is a perspective view of one of the embodiments of the power supply apparatus for sliding door. The power supply apparatus for sliding door 1 of the embodiment includes a body-side fixing unit 10 installed in a prescribed position of the vehicle body, and a door-side fixing unit 20 installed in a prescribed position of the sliding door. A flat cable 30 is arranged to run between the body-side fixing unit 10 and the door-side fixing unit 20.

The power supply apparatus for sliding door 1 of the embodiment has a structure in which the flat cable 30 is prevented from being sagged by the weight thereof in a crossing portion (i.e., the portion where the flat cable is arranged to run) between the body-side fixing unit 10 and the door-side fixing unit 20.

The flat cable 30 is arranged to run such that a longitudinal direction in a cross sectional area 33 of the flat cable runs vertical in the crossing portion. Under the above described arrangement of the cable, a bent portion 34 is formed in the flat cable 30. More specifically, when the door-side fixing unit 20 moves as depicted by an arrow in FIG. 1 according to the opening and closing of the sliding door, the bent portion 34 is formed on the flat cable 30 with its position changed.

In the present invention, in order to prevent the flat cable 30 from being sagged by the weight thereof, a longitudinal direction in the cross sectional area 33 in at least the bent portion 34 is arranged to be in accordance with a height direction of the vehicle body. The above described arrangement of the cross sectional area 33 in the bent portion 34 of the flat cable 30 enables the flat cable 30 to sustain the configuration by the mechanical strength thereof, thus not being sagged.

It is preferable that a conductor enclosed within the flat cable 30 comprises a rectangular conductor, so that the flat cable 30 is not sagged in the crossing portion. The rectangular conductor has high yield strength to a tensile strength along a surface thereof. Thus, the flat cable enables to resist the tensile strength applied by the weight thereof to prevent from being sagged.

In addition, it is further preferable that the face 33 (i.e., cross sectional face) in at least the bent portion 34 of the flat cable 30 is perpendicular to the crossing direction between the vehicle body and the sliding door. When the face 33 in the bent portion 34 is set to be perpendicular to the crossing direction, the self-weight applied by the flat cable 30 in the bent portion is evenly distributed in both sides thereof. As a result, the configuration of the bent portion 34 is surely maintained so that the longitudinal axis of the face 33 is stably maintained to be in the height direction of the vehicle. More specifically, the flat cable 30 as the wire harness for supplying power to the sliding door can be prevented from being contacted with the vehicle body or the sliding door to be damaged.

The direction of the longitudinal axis of the face 33 of the flat cable 30 is in conformity to the height direction of the vehicle body in the bent portion 34, whereas in other portions for example in the vicinity of the body-side fixing unit 10 or in the vicinity of the door-side fixing unit 20, the direction of the longitudinal axis of the face 33 is not necessarily in conformity to the height direction of the vehicle body.

Figure 2:
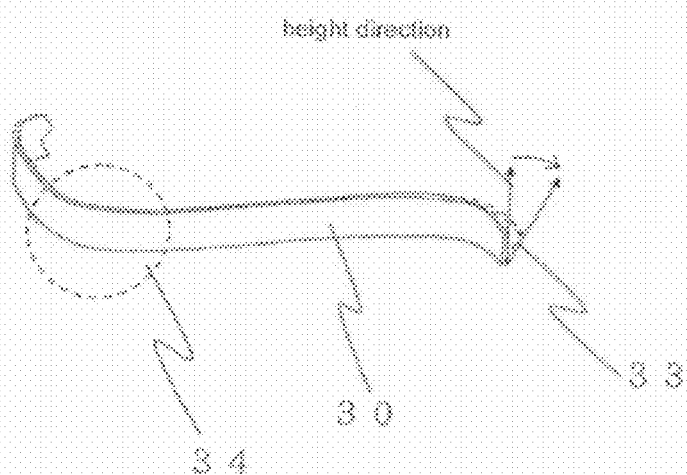
FIG. 2 is a view showing an example of the flat cable with the end portion 30 inclined.

For example, the longitudinal axis of the cross sectional face 33 of the flat cable 30 may be inclined as depicted in FIG. 2 in the vicinity of the body-side fixing unit 10 or in the vicinity of the sliding-side fixing unit 20. More specifically, as far as it is concerned that the longitudinal axis of the cross sectional face 33 is in conformity to the height direction of the vehicle body, the longitudinal axis of the face 33 of the flat cable 30 may be inclined in any other portion except the bent portion 34.

Figure 3:
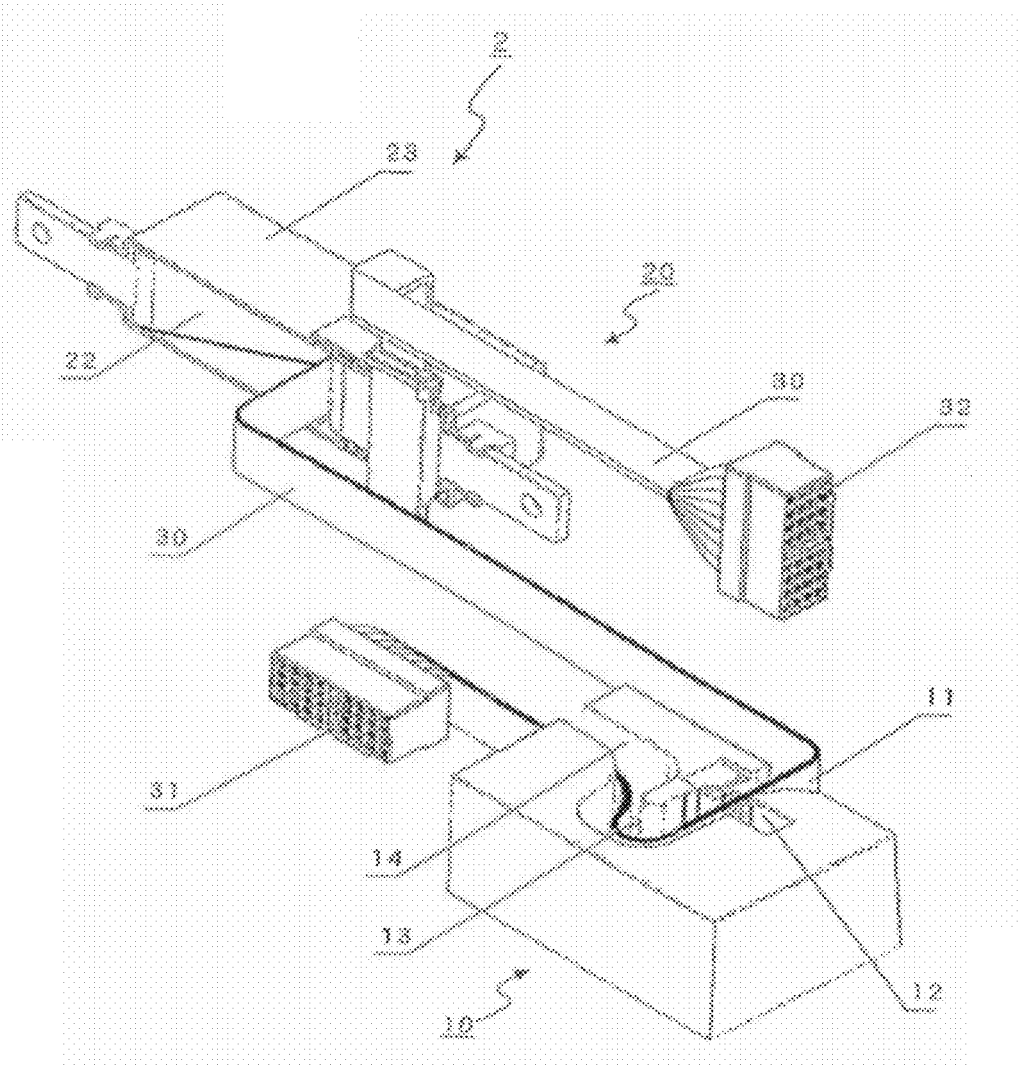
FIG. 3 is a perspective view of another embodiment of the power supply apparatus for sliding door of the invention.

Another embodiment of the power supply apparatus for sliding door of the invention is depicted in FIG. 3. FIG. 3 is a perspective view of another embodiment of the power supply apparatus for sliding door of the invention. The power supply apparatus for sliding door 1 of the embodiment includes a body-side fixing unit 10 installed in a prescribed position of the vehicle body and a door-side fixing unit 20 installed in a prescribed position of the sliding door. A flat cable 30, as the wire harness for supplying power from the body side to the sliding side, is arranged to run between the body-side fixing unit 10 and the door-side fixing unit 20.

In this embodiment, the flat cable 30 includes a connector 31 for connecting to the vehicle body side, and a connector 32 for connecting to the sliding door side on both ends thereof. The flat cable 30 is arranged to run through the respective inner portions of the body-side fixing unit 10 and the door-side fixing unit 20.

The flat cable 30 may comprises a single piece or bundled pieces. In FIG. 3, an example of the flat cable 30 comprising bundled pieces is shown. Each of the plurality of pieces of the flat cable 30 is integrally connected to the respective connector 31 and connector 32.

The body-side fixing unit 10 is fixed to a prescribed portion of the vehicle body and functions to hold one end of the flat cable 30. More specifically, in this embodiment, one end of the flat cable 30 is inserted into an inlet 11, and fixed by a cable band. The flat cable 30 is arranged to run through a surplus length receiving portion 13 and an outlet 14 of the body-side fixing unit 10 to the vehicle body. A lock insertion portion 15 as the lock mechanism is provided in the body-side fixing unit 10. The detail of the lock mechanism is described later.

Figure 4:
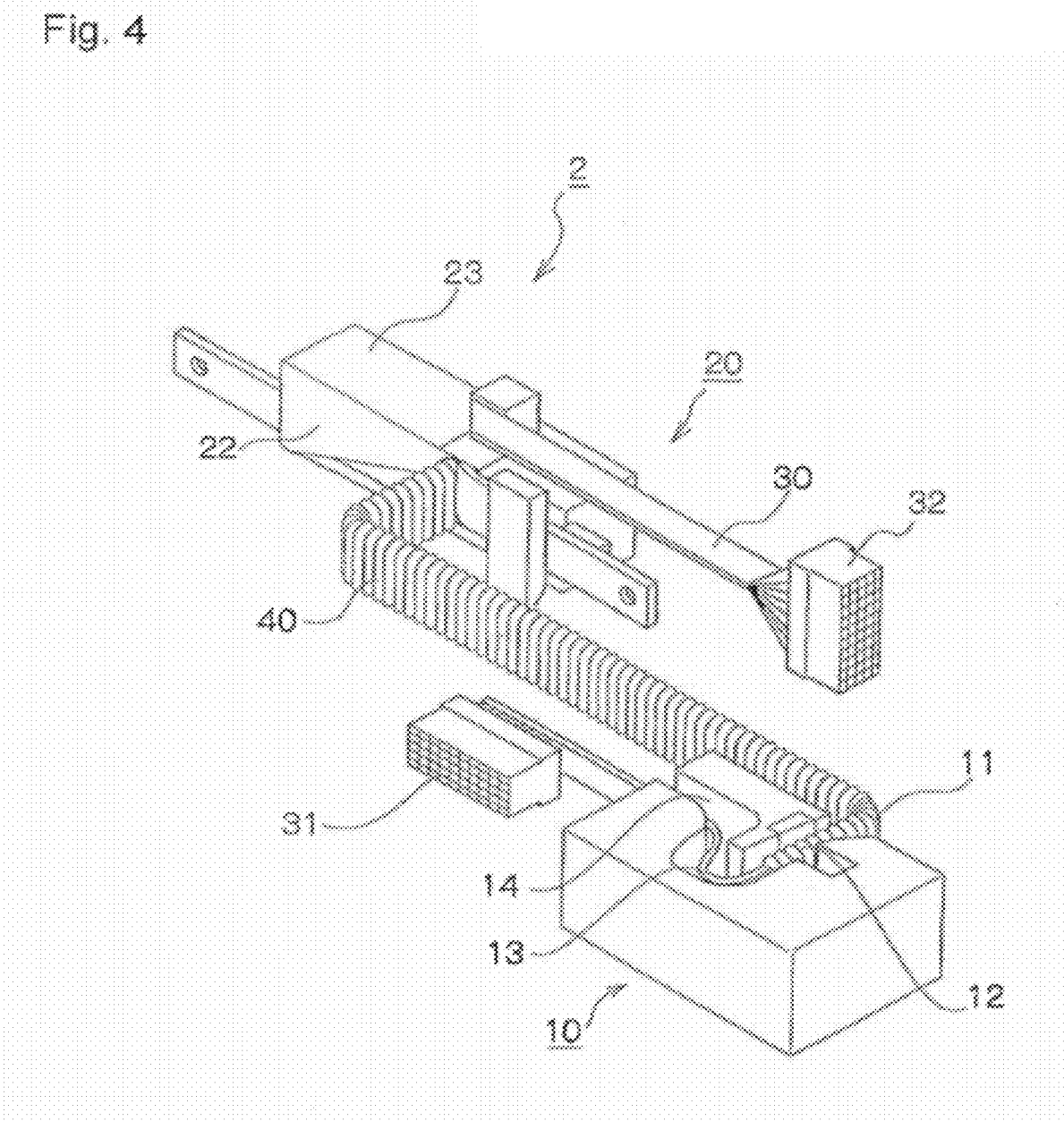
FIG. 4 is a perspective view of other embodiment of the power supply apparatus for sliding door of the invention.

Other embodiment of the power supply apparatus for sliding door of the invention is depicted in FIG. 4. FIG. 4 is a perspective view of other embodiment of the power supply apparatus for sliding door of the invention. The power supply apparatus for sliding door 2 of the embodiment includes a body-side fixing unit 10 installed in a prescribed position of the vehicle body and a door-side fixing unit 20 installed in a prescribed position of the sliding door. A flat cable 30, as the wire harness for supplying power from the vehicle body side to the sliding side, is arranged to run between the body-side fixing unit 10 and the door-side fixing unit 20, and a corrugated tube 40 for covering the flat cable 30 is provided.

The flat cable 30 is arranged to run such that the flat cable has a prescribed surplus length in the surplus length receiving portion 13. Particularly in case that at least two pieces of flat cable are bundled, the flat cable 30 is arranged to run so that the surplus length is different from each other in the respective pieces. Since the flat cable is arranged to run as described above, it is designed that a large tensile force is not applied on the flat cable 30.

More specifically, it is considered that a large tensile force is applied on the flat cable 30 because of the manufacture tolerance and the assembly tolerance of the body-side fixing unit 10, and the installation tolerance of the body-side fixing unit 10 to the vehicle body. In addition, it is considered that a large tensile force is applied on the flat cable 30 because the connector 31 is pulled or inclined when the body-side fixing unit 10 is installed. In the power supply apparatus for sliding door 2 of the embodiment, it is designed that the flat cable 30 has a prescribed surplus length in the surplus length receiving portion 13, thus a large tensile force is not applied on the flat cable even the above described considerations occur. As an example of the flat cable 30 comprising at least two bundled pieces, the running arrangement of the flat cable 30 in the surplus length receiving portion 13 is depicted in FIG. 5.

Figure 5:
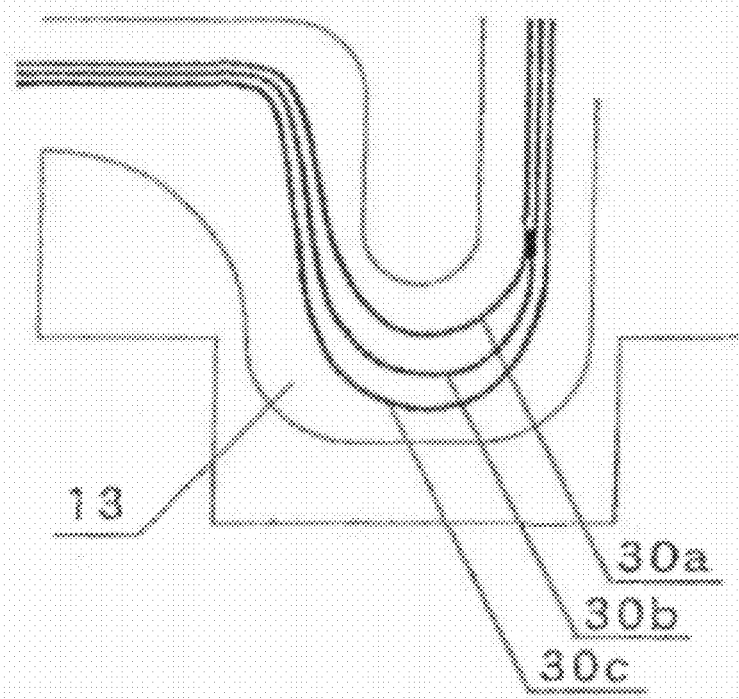
FIG. 5 shows an example in which at least two pieces of the flat cable 30 are arranged to run in the surplus length receiving portion 13.

FIG. 5 shows an example in which three pieces 30a, 30b, 30c of the flat cable 30 are arranged to run in the surplus length receiving portion 13. The surplus length of the piece 30a of the flat cable is the shortest, and the surplus lengths of the pieces 30b and 30c of the flat cable become gradually longer in this order. It is designed that the difference between the surplus length of the piece 30a and the piece 30b of the flat cable becomes longer than at least a total of the manufacture tolerance, assembly tolerance and the installation tolerance. In a similar fashion, it is designed that the difference between the surplus length of the piece 30b and the piece 30c of the flat cable becomes substantially the same as the difference between the surplus length of the piece 30a and the piece 30b of the flat cable.

Thus, in case that the flat cable 30 comprises a plurality of bundled pieces, since each piece 30a, 30b, 30c of the flat cable 30 has a prescribed difference (for example several mm) in the surplus length, improper stress is not applied thereto. Although the surplus length receiving portion 13 is provided in the body-side fixing unit 10 in this embodiment, the surplus length receiving portion 13 may be provided in the door-side fixing unit 20 or in both of the body-side fixing unit 10 and the door-side fixing unit 20. In either case, it can be designed that improper stress is not applied to the flat cable 30.

Figure 6:
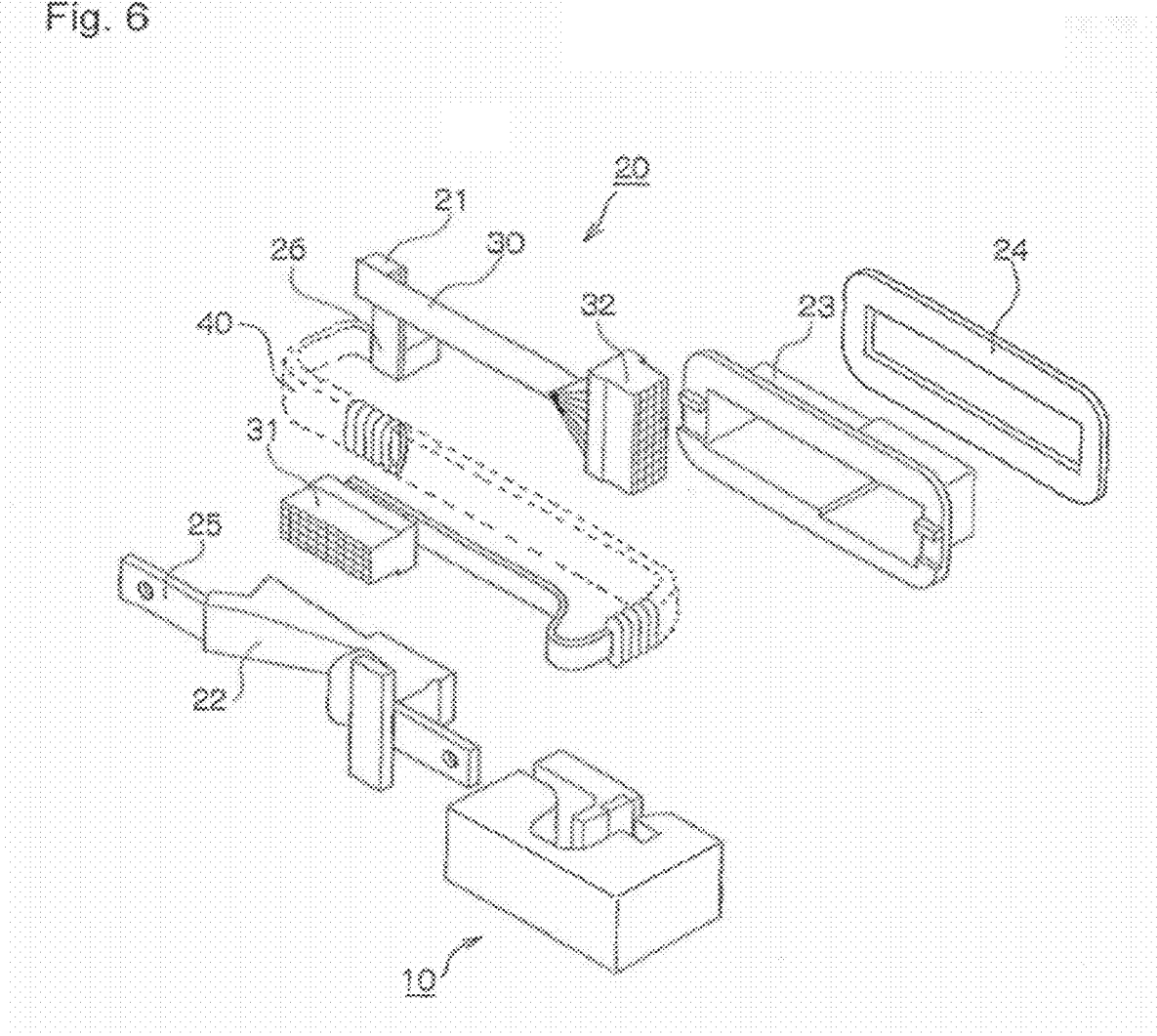
FIG. 6 shows main components forming the door-side fixing unit 20.

The structure of the door-side fixing unit 20 is explained with reference to FIG. 6. FIG. 6 shows main components forming the door-side fixing unit 20. The door-side fixing unit 20 includes a cable extracting portion 21, a door holder 22, a holder cover 23 and a water proof seal 24. A lock receiving portion 25 as the lock mechanism (the detail thereof is described later) is provided in the door-side fixing unit 20. The lock receiving portion 25 corresponds to the lock insertion portion 15 of the lock mechanism provided in the previously described body-side fixing unit 10.

The other end of the corrugated tube 40 is fixed to the cable extracting portion 21 by the cable band 26. The flat cable 30 is arranged to run from the outlet of the other end of the corrugated tube 40 through the cable extracting portion 21 to the sliding door. The cable extracting portion 21 is fixed to a prescribed portion of the door holder 22, and covered together with the door holder by the holder cover 23. The holder cover 23 functions to protect the flat cable 30 from damage by gravel stones and water. Further more, the water proof seal 24 is inserted between the holder cover 23 and the door panel to prevent water from infiltrating into the inside through a gap between the holder cover 23 and the door panel so that the door holder 22 and the holder cover 23 are integrally fixed to the door panel.

Figure 7:
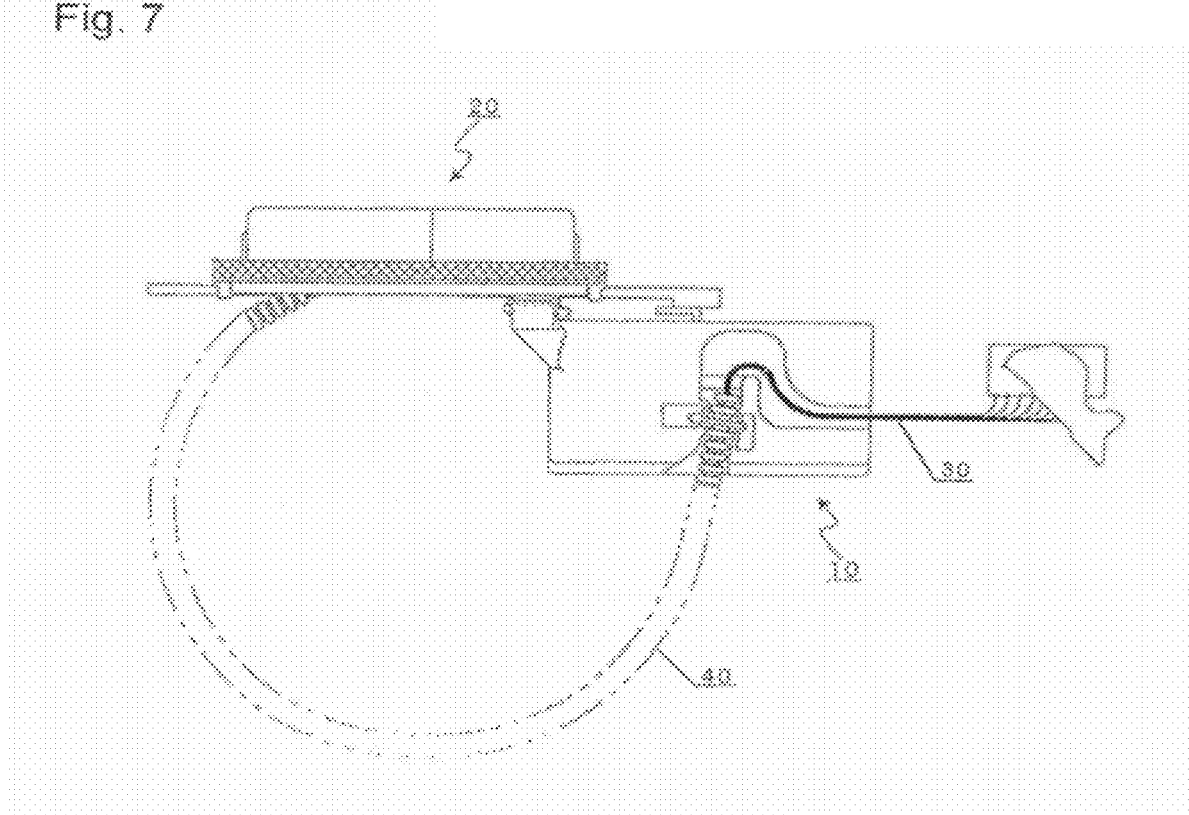
FIG. 7 is a plan view showing an example of the shipment configuration of an embodiment of the power supply apparatus for sliding door of the invention.

FIG. 7 is a plan view showing an example of the shipment configuration of an embodiment of the power supply apparatus for sliding door of the invention. As depicted in FIG. 7, the body-side fixing unit 10 is coupled to the door-side fixing unit 20 by the lock mechanism. The flat cable 30 together with the corrugated tube covering the outer surface thereof are in a state of being bent so as to have a prescribed curvature radius. For example, after the power supply apparatus for sliding door as depicted in FIG. 4 is manufactured, the both fixing units are provisionally fixed in such manner as depicted in FIG. 7 until those fixing units are installed in the sliding door and the vehicle body. As for the power supply apparatus for sliding door 1 as depicted in FIG. 3, as well as the power supply apparatus for sliding door 2 as depicted in FIG. 4, the body-side fixing unit 10 may be coupled to the door-side fixing unit 20 by the lock mechanism.

Thus, the body-side fixing unit 10 and the door-side fixing unit 20 are coupled such that the flat cable 30 or/and the corrugated tube 40 are put in a pattern of being bent (i.e., bent pattern) in a specific direction. Accordingly, the flat cable 30 or/and the corrugated tube 40 of the power supply apparatus for sliding door 1, 2 may be prevented from being bent in a different direction from the specific direction, or from being deformed. More specifically, the bent pattern is made so that the bent portion 34 of the flat cable 30 as depicted in FIG. 1 or 2 is easily formed.

FIG. 8 is a plan view showing an example of the shipment configuration of other embodiment of the power supply apparatus for sliding door of the invention. As depicted in FIG. 8, the configurations of the lock mechanism include a lock type fitting (FIG. 8(a)), and a press type fitting (FIG. 8(b)). When a protruding portion is provided in the inner wall of the inlet of the lock receiving portion 25 in the press type fitting as depicted in FIG. 8(b), the lock insertion portion 15 inserted into the lock receiving portion 25 is pressed by the protruding portion, thus the lock insertion portion can be held in the lock receiving portion.

Figure 9:
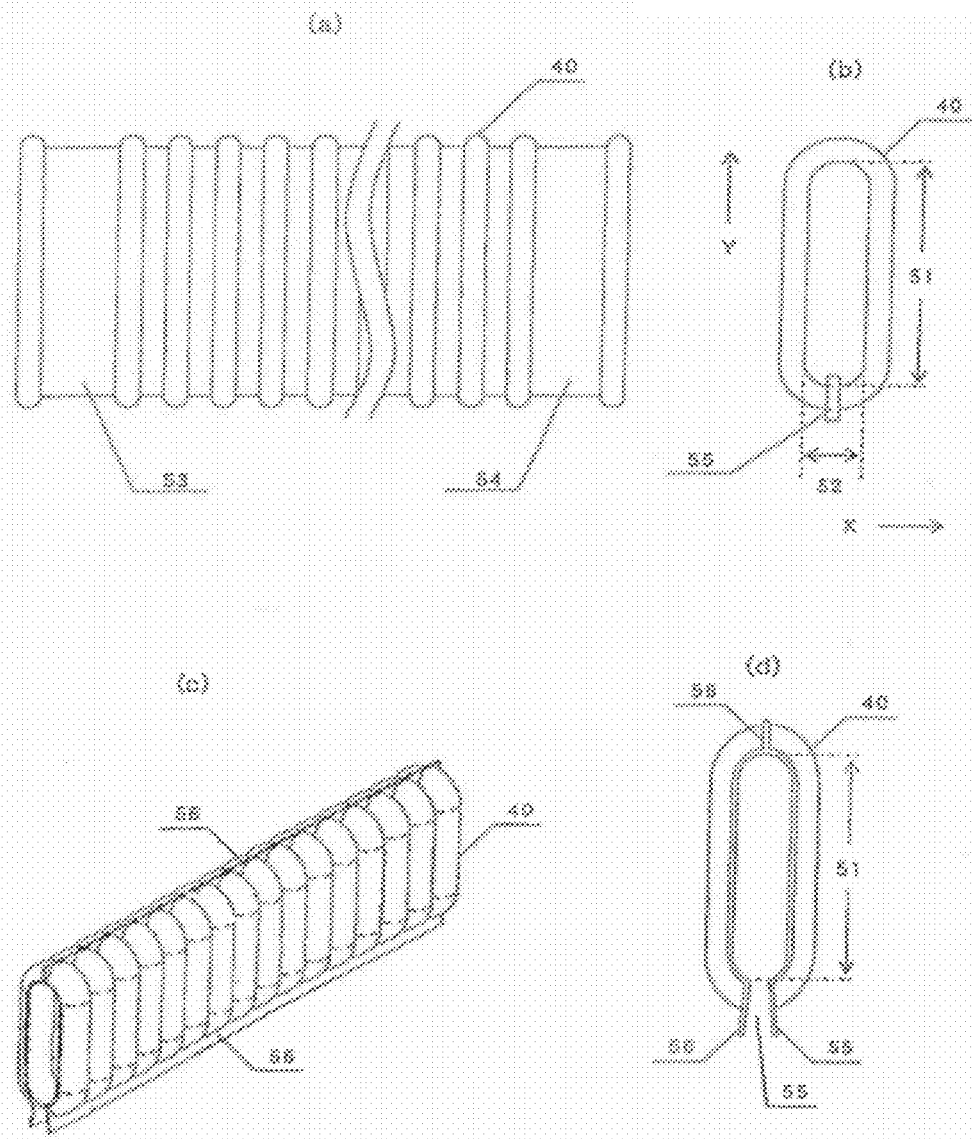
FIG. 9 shows a schematic view of the corrugated tube as the electric cable protecting member.

FIG. 9 shows a schematic view of the corrugated tube used in the power supply apparatus for sliding door as depicted in FIG. 4. FIG. 9(a) is a side view of the corrugated tube 40, and FIG. 9(b) is a cross sectional view of the corrugated tube 40. As depicted in FIG. 9(a), the contour of the corrugated tube comprises wave shape. In addition, as depicted in FIG. 9(b), the cross section of the corrugated tube 40 has a vertically long configuration, and a hollow space in the inside thereof.

FIGS. 9(c) and 9(b) show an example in which a rib 56 extending along the longitudinal direction is additionally added in the respective upper face and lower face of the corrugated tube 40. FIG. 9(c) is a perspective view of the corrugated tube with the rib 56, and Fig. (d) is a cross sectional view thereof. When the rib is formed as depicted in FIGS. 9(c) and 9(d), the degree of the extension of the corrugated tube 40 is made mild when the tensile force is applied to the corrugated tube 40.

With the above-described structure of the corrugated tube 40, the corrugated tube 40 is very bendable (very flexible) in the lateral direction (i.e., X direction in FIG. 9(b)), while is hardly bent in the vertical direction (i.e., Y direction in FIG. 9(b)). Since the rib 56 as depicted in FIGS. 9(c), 9(d) is formed on the top and bottom faces respectively, the flexibility of the corrugated tube 40 in the lateral direction is not affected.

The size of the cross section of the corrugated tube 40 is that the vertical length 51 depicted in FIG. 9(b) is larger than at least the width of the flat cable 30, while the lateral length 52 depicted in FIG. 9(b) is larger than the thickness (when a plurality of pieces of the flat cable are bundled, a total thickness of the flat cable 30) of the flat cable 30.

As depicted in FIG. 9(a), two portions 53, 54 on the respective ends of the corrugated tube 40 are provided in which the wave shapes are not formed. The two portions are to be fixed by the cable band 12, 26 in the body-side fixing unit 10 and the door-side fixing unit 20, respectively. The portions to be respectively fixed in the body-side fixing unit 10 and the door-side fixing unit 20 are distinctly provided as described above, the corrugated tube 40 is surely fixed to the body-side fixing unit 10 and the door-side fixing unit 20 such that the length of the corrugated tube 40 between the body-side fixing unit 10 and the door-side fixing unit 20 is as originally designed.

As depicted in FIGS. 9(b), 9(d), a cut portion 55 is provided in the lower portion of the corrugated tube 40. With thus formed cut portion, even if gravel stones or the like are slipped in the corrugated tube 40, those stones are discharged through the cut portion 55. The width of the cut portion 55 is designed to be smaller than the thickness of the flat cable 30 (when a plurality of pieces of the flat cable are bundled, a total thickness of the flat cable 30), thus preventing the flat cable 30 from being dropped out of the cut portion 55.

Since the corrugated tube 40 has elasticity, it is possible that the flat cable 30 is inserted through the cut portion 55 into the corrugated tube, or the flat cable 30 is extracted through the cut portion 55 from the corrugated tube 40. Thus, it becomes possible that the flat cable 30 is installed within the corrugated tube 40, after the corrugated tube 40 is prepared, so that the assembly of the power supply apparatus for sliding door 2 comes to be efficiently effected. As described above, since the flat cable 30 has tension itself, the flat cable is hardly sagged downward when the flat cable is placed in such manner that the width direction of the flat cable is vertically arranged. Accordingly, even though the cut portion 55 is provided in the lower portion of the corrugated tube 40, the function of the power supply apparatus for sliding door 2 is not affected.

In the power supply apparatus for sliding door 2 of this embodiment, the corrugated tube 40 is arranged to run between the body-side fixing unit 10 and the door-side fixing unit 20, while the flat cable 30 is installed within the corrugated tube 40. Thus, the corrugated tube 40 structurally has high flexibility in the lateral direction. In other words, the corrugated tube 40 may be bent with small curvature radius. For example, it is possible to realize that the minimum curvature radius is 70 mm, while the curvature radius of the flat cable 30 is about 14 mm. The corrugated tube 40 therefore can be bent to the extent of the minimum curvature radius of 70 mm of the corrugated tube itself.

As described above, since the corrugated tube 40 can be bent with a small curvature of radius, the length of the corrugated tube 40 can be made shorter. More specifically, when the sliding door is fully opened or closed, the corrugated tube 40 is bent with a minimum curvature of radius in a connecting portion with the body-side fixing unit 10 or the door-side fixing unit 20. So when the curvature of radius becomes small, the length of arc in the bent portion becomes shorter.

In the power supply apparatus for sliding door 2 of this embodiment, both ends of the corrugated tube 40 are sustained by the body-side fixing unit 10 or the door-side fixing unit 20, while the intermediate portion of the corrugated tube 40 is not sustained. Since the corrugated tube 40 is formed as depicted in FIG. 9, the corrugated tube 40 is slightly sagged downward by the weight itself, while the corrugated tube 40 is constructed to move relatively free in the horizontal direction.

It is considered that since the corrugated tube 40 is constructed to move relatively free in the horizontal direction, the corrugated tube 40 contacts with the vehicle body or the sliding door to be damaged or generate abnormal noises at the time when the sliding door is opened/closed, or the vehicle runs with the sliding door closed. However, in the power supply apparatus for sliding door 2 of this embodiment, the corrugated tube 40 is designed not to contact with the vehicle body or the sliding door by the means explained hereunder. The means can be applied as well to the power supply apparatus for sliding door 1 so that the flat cable 30 does not contact with the vehicle body or the sliding door.

In the power supply apparatus for sliding door 1, 2, it is designed that the flat cable 30 or/and the corrugated tube 40 have the bent pattern (i.e., habit to be bent) in the specific direction. In order to cause the flat cable 30 or/and the corrugated tube 40 to have the bent pattern in the specific direction, a prescribed lock mechanism is provided in the body-side fixing unit 10 and the door-side fixing unit 20.

In more detail, a lock insertion portion 15 is provided in the body-side fixing unit 10, and a lock receiving portion 25 is provided in the door-side fixing unit 20. For example, during the time between the manufacturing of the power supply apparatus for sliding door and the fixing thereof to the vehicle, the lock insertion portion 15 is inserted into the lock receiving portion 25 to couple the body-side fixing unit 10 with the sliding door-side fixing unit 20, thus enabling to give the bent pattern to the flat cable 30 or/and the corrugated tube 40.

The connection of the lock insertion portion 15 and the lock receiving portion 25 is continued until the time that the door-side fixing unit 20 is fixed to the door panel and then the body-side fixing unit 10 is fixed to the vehicle body, thus the bent pattern different from the specific direction is prevented from being given to the flat cable 30 or/and the corrugated tube 40.

Figure 10:
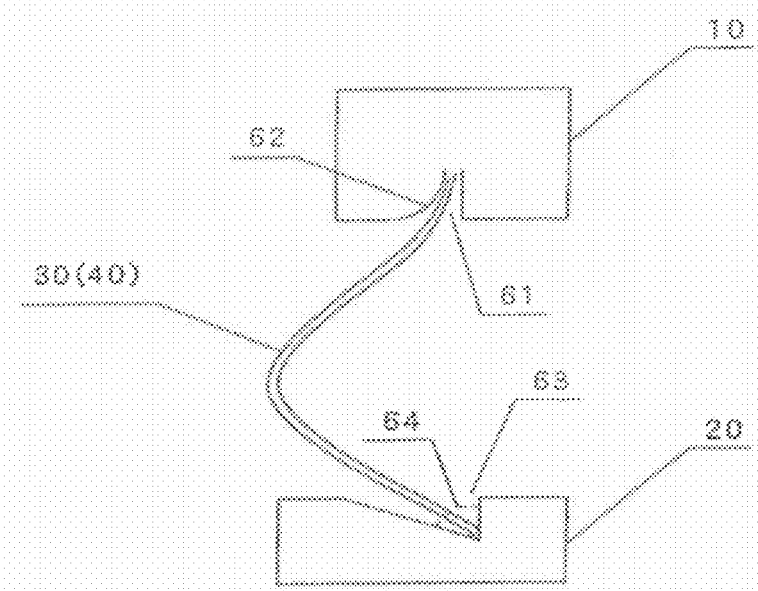
FIG. 10 shows an example to explain a method of fixing the flat cable 30 or/and corrugated tube 40.

Furthermore, the connection of the body-side fixing unit 10 to the flat cable 30 or/and the corrugated tube 40, as well as the connection of the door-side fixing unit 20 to the flat cable 30 or/and the corrugated tube 40 are made with a prescribed angle to the longitudinal direction of the flat cable 30 or/and the corrugated tube 40, thus enabling surely to prevent the flat cable 30 or/and the corrugated tube 40 from being contacted with the vehicle body and the sliding door. FIG. 10 shows an example to explain a method of fixing the flat cable 30 or/and corrugated tube 40 in case that the body-side fixing unit 10 is installed in the vehicle body located in the vicinity of the center of the sliding door when the sliding door is closed, and the door-side fixing unit 20 is provided in a forward position of the sliding door.

In FIG. 10, the body-side fixing unit 10, the door-side fixing unit 20, and the flat cable (or the corrugated tube 40) as depicted in FIGS. 3 and 4 are simplified and showed. In this example, the flat cable 30 or/and the corrugated tube 40 is almost vertically fixed to the body-side fixing unit 10. A curved portion 62 is provided in an outlet portion 61 such that the flat cable 30 or/and the corrugated tube 40 are not bent at an angle smaller than the prescribed curvature radius. On the other hand, the flat cable 30 or/and the corrugated tube 40 are slantingly fixed to the door-side fixing unit 20 in such manner that the flat cable 30 or/and the corrugated tube 40 forwardly extend (i.e., to left side in the drawing). It is designed that the flat cable 30 or/and the corrugated tube 40 are bent within an angle 64 provided in the opening portion in the outlet portion 63.

Since the angle 64 in the opening portion in the outlet portion 63 of the door-side fixing unit 20 is slantingly formed from the vehicle body side toward the front side of the vehicle body, the flat cable 30 or/and the corrugated tube 40 are to be bent in the direction of the front side of the vehicle body. Thus, the flat cable 30 or/and the corrugated tube 40 can be prevented from bending toward the back side of the vehicle body (i.e., to the right side in the drawing). At the same time, the bent pattern always bending in the direction toward the front side of the vehicle body (i.e., to the left side in the drawing) is given to the flat cable 30 or/and the corrugated tube 40 in the door-side fixing unit 20 under the condition where the power supply apparatus for sliding door 1, 2 are attached to the vehicle body and the sliding door, respectively.

The direction of the bent pattern corresponds to the direction of the bent portion 34 of the flat cable 30 as depicted in FIGS. 1 and 2. More specifically, in case that the direction of the bent portion 30 of the flat cable 30 as depicted in FIGS. 1 and 2 is desired always to be the same way, the flat cable 30 or/and the corrugated tube 40 are to be slantingly fixed to the door-side fixing unit 20 in such manner that the flat cable 30 or/and the corrugated tube 40 forwardly extend (i.e., to left side in the drawing), as depicted in FIG. 10.

Figure 11:
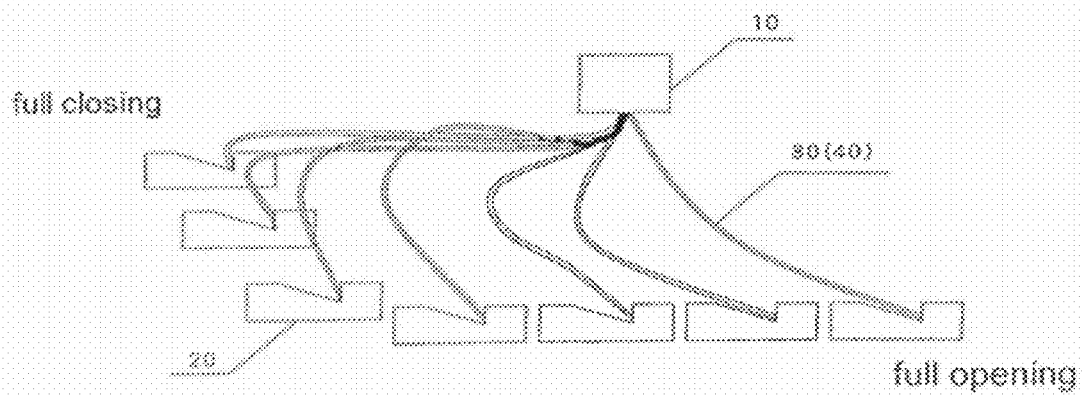
FIG. 11 is a view to explain the step by step operation of the flat cable 30 or/and corrugated tube 40 during the time from the full closing of the sliding door to full opening of the sliding door.

FIG. 11 shows an example of the operation of the flat cable 30 or/and corrugated tube 40 in case that while the bent pattern bending to the specified direction is given to the flat cable 30 or/and corrugated tube 40, the body-side fixing unit 10 and the door-side fixing unit 20 are connected to the flat cable 30 or/and corrugated tube 40 respectively as depicted in FIG. 10. In FIG. 11, the sequential movements of the flat cable 30 or/and corrugated tube 40 are shown all together from the state of the sliding door to be fully closed to the state of the sliding door to be fully opened, while the vehicle body and the sliding door are not shown. Now, it is designed that the most protruded portion of the vehicle body to the door side corresponds to the most protruded portion of the body-side fixing unit 10 to the door side, while the most protruded portion of the sliding door to the vehicle body corresponds to the most protruded portion of the door-side fixing unit 20 to the vehicle body side.

As shown in FIG. 11, it can be recognized that the flat cable 30 or/and corrugated tube 40 move between the vehicle body and the sliding door without contacting with either of the flat cable 30 or corrugated tube 40. In FIG. 11, the left side in the drawing shows the front side of the vehicle, while the right side in the drawing shows the back side of the vehicle. More specifically, it is preferable that the flat cable 30 or/and corrugated tube 40 are always bent toward the front of the vehicle under the condition where the power supply apparatus for sliding door 1, 2 is attached to the vehicle body and the sliding door respectively. In addition to the above, it is preferable that the bent pattern is given to the flat cable 30 or/and corrugated tube 40, as depicted in FIG. 7. With the above described arrangement, the flat cable 30 or/and corrugated tube 40 of the power supply apparatus for sliding door 1, 2 can be prevented from being given a different bent pattern or deformed. Thus, the movement of the flat cable 30 or/and corrugated tube 40 become smooth when the sliding door is opened and closed.

Furthermore, in the example as depicted in FIG. 11, the flat cable 30 or/and corrugated tube 40 most closely approach the vehicle body when the sliding door is fully closed. In the power supply apparatus for sliding door 1, 2 of this embodiment, the length of the flat cable 30 or/and corrugated tube 40 is adjusted such that there is no loosening in the flat cable 30 or/and corrugated tube 40 when the sliding door is fully closed. In addition, a prescribed tension is applied to the flat cable 30 or/and corrugated tube 40. Thus, it can be more secured that the flat cable 30 or/and corrugated tube 40 are prevented from contacting with the vehicle body or the sliding door when the flat cable 30 or/and corrugated tube 40 are vibrated during driving the vehicle.

Since the flat cable 30 or/and corrugated tube 40 have strong tensile force in the face direction as described above, even if the flat cable 30 or/and corrugated tube 40 are stamped by foot when the sliding door is fully opened, the flat cable 30 or/and corrugated tube 40 are not damaged. When the flat cable 30 or/and corrugated tube 40 is arranged on the bracket (not shown), even if stamped by foot, the flat cable 30 or/and corrugated tube 40 may be temporarily twisted and quickly restored to the original shape.

The specification is based on the Japanese Patent Applications 2005-256814 filed on Sep. 5, 2005 and filed on Mar. 29, 2006, and all the contents thereof are incorporated herein.

The invention claimed is:

1. A power supply apparatus for a sliding door of a vehicle body, the sliding door being capable of moving in a first direction along the vehicle body, when moving from an open position of the sliding door toward a closed position of the sliding door, comprising:
   a body-side fixing unit fixed to the vehicle body;
   a door-side fixing unit fixed to the sliding door; and
   a flat cable having a connector on both ends thereof respectively, the flat cable being fixed to the body-side fixing unit and being arranged to run from the vehicle body through the body-side fixing unit and the door-side fixing unit to the sliding door;
   wherein the body-side fixing unit is configured to restrict the end of the flat cable that is adjacent the body-side or door-side fixing unit to extend away from the body-side fixing unit and toward the door-side fixing unit in a direction substantially perpendicular to the vehicle body, and wherein the door-side fixing unit is configured to restrict the end of the flat cable that is adjacent the door-side fixing unit to extend away from the door-side fixing unit, and toward the body-side fixing unit, in a direction having a component, in a direction along the vehicle body, that extends in the first direction, and
   wherein the flat cable is flattened such that the flat cable is elongated in cross section in at least a bent portion of the flat cable between said body-side fixing unit and said door-side fixing unit, wherein the direction of elongation is in accordance with a height direction of the vehicle body.

2. The power supply apparatus for the sliding door according to claim 1, wherein the flat cable is flattened to be elongated in cross section in a direction perpendicular to a crossing direction defined by a direction perpendicular to both of the vehicle body and the sliding door.

3. The power supply apparatus for the sliding door according to claim 1, wherein a conductor enclosed within the flat cable comprises a rectangular conductor.

4. The power supply apparatus for the sliding door according to claim 1, which further includes a lock mechanism which couples the body-side fixing unit and the door-side fixing unit to be provisionally fixed each other.

5. The power supply apparatus for the sliding door according to claim 4, wherein the lock mechanism provisionally fixes the body-side fixing unit to the door-side fixing unit, even when the door-side fixing unit is fixed to the sliding door.

6. The power supply apparatus for the sliding door according to claim 1, wherein the flat cable has a prescribed surplus length within at least one of the body-side fixing unit and the door-side fixing unit.

7. The power supply apparatus for the sliding door according to claim 6, wherein at least two flat cables are arranged in a bundle, and the respective prescribed surplus lengths of the flat cables are different by prescribed length.

8. The power supply apparatus for the sliding door according to claim 1, wherein a length of the flat cable is arranged such that a prescribed tensile force is applied on the flat cable when the sliding door is closed.

9. The power supply apparatus for the sliding door according to claim 1, wherein the body-side fixing unit is fixed to a vicinity of central portion of the vehicle body when the sliding door is closed, while the door-side fixing unit is fixed to a front portion of the sliding door.

10. The power supply apparatus for the sliding door according to claim 9, wherein the flat cable is fixed to the door-side fixing unit such that the flat cable is bendable within an angle formed by an opening portion at an outlet portion of the door-side fixing unit.

11. The power supply apparatus for the sliding door according to claim 1, wherein an electric cable protecting member is further provided in an enveloping manner across an outer surface of the flat cable arranged between the body-side fixing unit and the door-side fixing unit.

12. The power supply apparatus for the sliding door according to claim 11, wherein the electric cable protecting member comprises a corrugated tube with a wave-shaped outer configuration, thus being bendable along a side direction in a cross sectional area thereof.

13. The power supply apparatus for the sliding door according to claim 11, wherein the body-side fixing unit is fixed to a vicinity of central portion of the vehicle body when the sliding door is closed, while the door-side fixing unit is fixed to a front portion of the sliding door.

14. The power supply apparatus for the sliding door according to claim 13, wherein the electric cable protecting member is fixed to the door-side fixing unit such that the electric cable protecting member is bendable within an angle formed by an opening portion at an outlet portion of the door-side fixing unit.

15. The power supply apparatus for the sliding door according to claim 11, wherein a length of the electric cable protecting member is arranged such that a prescribed tensile force is applied on the electric cable protecting member when the sliding door is closed.

16. The power supply apparatus for the sliding door according to claim 11, wherein the electric cable protecting member has a cut portion across the lower portion thereof.

* * * * *